United States Patent [19]

Harmon

[11] 3,874,544
[45] Apr. 1, 1975

[54] PRESSURE VESSEL WITH LINER

[75] Inventor: Emerson R. Harmon, Hartland, Wis.

[73] Assignee: The Amolga Corporation, Menomonee Falls, Wis.

[22] Filed: Mar. 21, 1973

[21] Appl. No.: 343,200

[52] U.S. Cl. ............... 220/3, 138/147, 220/63 R
[51] Int. Cl. ........................................ B65d 25/14
[58] Field of Search ........... 220/3, 63 R, 83, 72, 63; 138/147, 144; 156/172; 137/144, 147

[56] References Cited
UNITED STATES PATENTS

| 417,800 | 12/1889 | Webb | 220/3 |
|---|---|---|---|
| 2,070,888 | 2/1937 | Eschenbrenner | 138/147 |
| 3,002,534 | 10/1961 | Noland | 220/3 |
| 3,124,001 | 3/1964 | Conley | 220/3 |
| 3,239,092 | 3/1966 | Levenetz | 220/3 |
| 3,282,757 | 11/1966 | Brussee | 220/3 |
| 3,335,903 | 8/1967 | Anderson | 220/83 |
| 3,335,904 | 8/1967 | Anderson | 220/83 |

*Primary Examiner*—William I. Price
*Assistant Examiner*—Allan N. Shoap
*Attorney, Agent, or Firm*—Andrus, Sceales, Starke & Sawall

[57] ABSTRACT

A pressure vessel having a composite outer shell or wall of continuous wound glass filaments impregnated with a thermosetting resinous material. The interior of the shell or wall is lined with a blow molded plastic liner which has annular rings or grooves spaced along the entire cylindrical section of the shell. These rings or grooves mechanically lock the blow molded liner to the outer structural shell so that the liner is prevented from shrinking away from the shell when the vessel is subjected to low temperatures.

7 Claims, 6 Drawing Figures

PATENTED APR 1 1975　　　　3,874,544

PRESSURE VESSEL WITH LINER

BACKGROUND OF THE INVENTION

In the prior manufacture of pressure vessels such as glass filament wound resin impregnated water softener tanks, the liner material used has been one which will chemically bond to the outer shell. The chemical bond resists the normal contraction of the liner material at low temperatures. However, the chemical bond tends to fail and the liner then shrinks away from the shell and consequently fails in tension. This invention substitutes an improved means for the chemical bond which is mechanically locking the liner to the shell of the vessel.

SUMMARY OF THE INVENTION

Currently there is a demand for corrosion resistant pressure vessels such as water softeners, fire extinguishers, oxygen cylinders and the like which can contain various types of fluids under high pressures at wide ranges of high and low temperatures. This invention is directed to a pressure vessel having an outer structural wall or shell comprised of continuous wound filaments or otherwise provided, impregnated with a thermosetting resin and then cured and having preferably a thermoplastic blow molded liner which is provided with abutments on the body of the liner in engagement with the filaments to lock the liner to the shell.

Under one embodiment of the invention the abutments on the liner are longitudinally spaced ribs or rings provided along the cylindrical portion thereof and which may extend circumferentially or helically around the liner or only partially therearound.

Under another embodiment the abutments of the liner are grooves which extend in spaced longitudinal relationship around or partially around the body of the liner.

It has been found that the liner should be of a material which has a coefficient of thermal expansion and contraction considerably greater than the material of the shell such as polyethylene.

The molded liner having either ribs or grooves is placed in a machine adapted to dispense continuous glass roving impregnated with a thermosetting resin along a predetermined calculated path. As the winding band or roving comes into contact with the blow molded liner, it will conform to the shape of the liner and flow into the grooves or over the annular rings. When the winding of the filaments onto the liner is completed and the vessel is cured, the liner is mechanically locked to the shell and is prevented by the ribs or grooves from shrinking from the shell when exposed to low temperatures.

DESCRIPTION OF THE DRAWINGS

The drawings furnished herewith illustrate a preferred construction of the present invention in which the above advantages and features are disclosed as well as others which will be clear from the following description of the preferred embodiment.

In the drawings.

DESCRIPTION OF THE INVENTION

Figure 1:
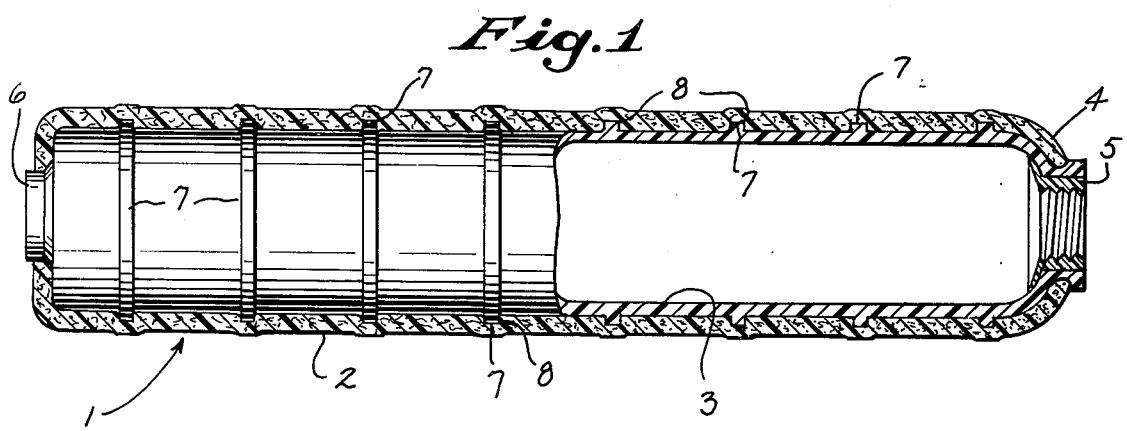
FIG. 1 is a sectional view of the vessel of the invention with a portion of the liner in elevation and illustrating the annular ribbed construction.

Referring to the drawings, there is shown a water softener tank 1 comprised of an outer shell 2 and an inner liner 3.

The outer shell 2 is composed of layers of glass filaments and a cured thermosetting resin such as of polyester or epoxy, the composite structure being helically overwound about the inner liner 3 which may be of blow molded polyethylene.

At the threaded port end of the tank, shell 2 and liner 3 extend inwardly to form an integral head 4 within which is secured the internally threaded port fitting 5 for receiving a cap, not shown, to close the tank or pressure vessel 1. The opposite end of the tank is closed around the blind port fitting 6 which is formed integrally with the body of the tank.

As illustrated in FIG. 1, the liner 3 is provided with the annular ribs 7 longitudinally spaced along the body of liner 3. One such rib 7 is illustrated in the enlarged sectional view in FIG. 2, and the side 8 of each rib 7 as illustrated more particularly in FIG. 2 toward the port end of tank 1 has a sharp corner in engagement with the glass filaments forming shell 2 to overcome any tendency of the liner to shrink in the direction of the port fitting 5 as would be the normal tendency of liner 3 when subjected to a low temperature.

Figure 3:
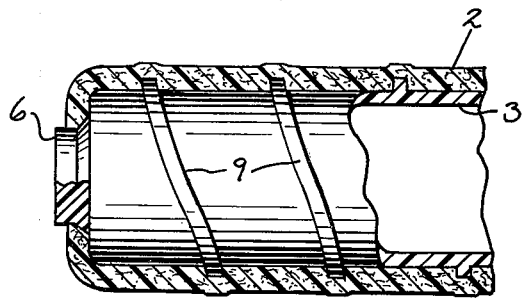
FIG. 3 is a sectional view of the vessel of the invention illustrating in elevation helically extending ribs on the liner.

FIG. 3 illustrates a portion of tank 1 having a shell 2 and liner 3 corresponding to that of FIG. 1, but in this embodiment the liner 3 is provided with the helically extending ribs 9 throughout the body of the liner.

Figure 4:
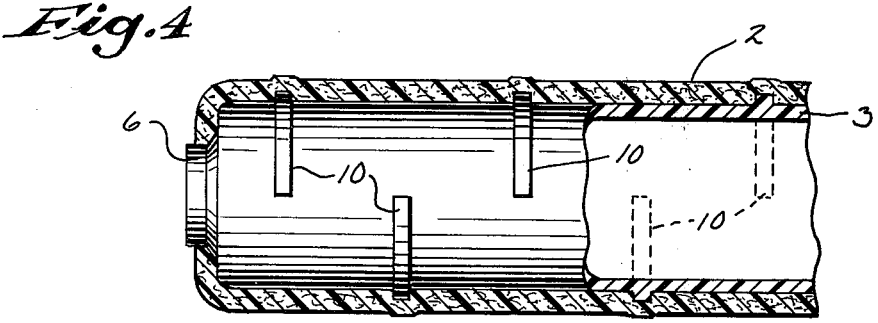
FIG. 4 is another sectional view with parts in elevation illustrating partially extending circumferential ribs on the liner which are offset from each other.

In FIG. 4 the liner 3 is illustrated as having the ribs 10 which extend only partially around the body of liner 3 and are spaced and offset longitudinally from each other.

Figure 5:
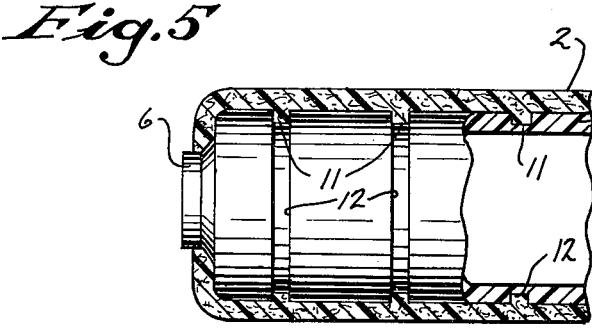
FIG. 5 is a sectional view of the vessel of the invention with parts in section illustrating the employment of annular grooves in the liner rather than ribs.

FIG. 5 illustrates the use of annular grooves 11 extending circumferentially around the body of liner 3 in spaced longitudinal relationship. The annular grooves 11 as with the ribs 9 may also extend helically of the body of the liner 3 or be offset and extend only partially around the body of liner 3 similarly to ribs 10 illustrated in FIG. 4.

Figure 6:
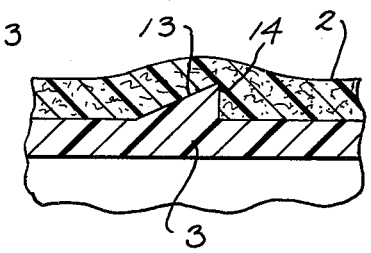
FIG. 6 is a detailed sectional view illustrating a wedge shaped liner lock.

In the detailed view of FIG. 6, the liner 3 is provided with spaced wedge shaped ribs such as the rib 13. When the resin impregnated glass filaments forming the shell 2 of the vessel are wound over the liner 3 and ribs 13, it overrides the wedge shaped ribs 13 in a complementary manner. The wall 14 of each rib 13 is placed in locking engagement with shell 2 and this overcomes any tendency of the liner to shrink towards the threaded bushing 5. The ribs 13 may extend circumferentially and also helically of the liner or be offset and extend only partially around the body of liner 3, or wedge shaped grooves may be provided in the liner in place of employing ribs 13 to thereby provide the locking abutments between the liner and shell.

Figure 2:
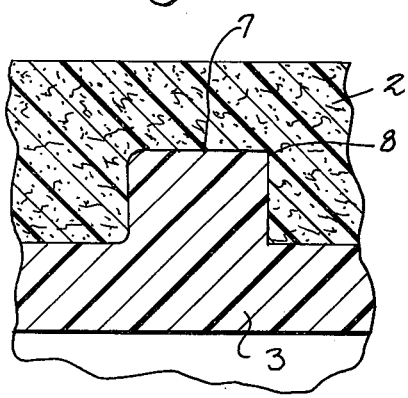
FIG. 2 is an enlarged section of a rib on the liner with the winding therearound and illustrating a sharp corner on the rib on the side toward the direction in which the liner would tend to shrink.

As in the case of the ribs 7 illustrated in FIGS. 1 and 2, the side 12 of each groove 11 toward the port opening has a sharp corner to overcome any tendency of the liner 3 to shrink toward the threaded port fitting 5 of the tank. Similarly, ribs 9 illustrated in FIG. 3 and ribs 10 illustrated in FIG. 4 have sharp corners on the sides toward the port fitting 5 of tank 1.

In all the embodiments illustrating the invention the liner 3 is of a material which has a coefficient of thermal expansion and contraction greater than that of the cured resin/glass composites of which shell 2 is formed. Polyethylene has proved to be a satisfactory liner material, and liner 3 can be formed with the ribs or grooves by the well known process of blow molding. In this process, the polyethylene is placed in a mold, not shown, in a plastic state and then blown outwardly to conform to the interior mold surface and produce the ribs or grooves on the liner 3 which are desired.

The invention has found particular application in the use of the mechanical locking means or abutments formed of ribs or grooves on liner 3 in filament wound resin impregnated water softener tanks. A water softener tank may reach a low temperature of approximately 35°F and in a regeneration cycle the tank can be at zero pressure per square inch gauge. When regeneration is complete the tank is automatically pressurized to that of the incoming water supply. Liner 3 under the invention is mechanically locked or held to the outer shell and not displaced during the O psig regeneration state and stretched back to shell 2 when repressurized. The abutments prevent the eventual liner failure that has resulted with liners chemically bonded to the shell of the tank.

Under this invention the liner is restrained only by mechanical means and the abutment construction can be applied to any type of liner material which has sufficient ribs or grooves to support the winding tension without other means of support and providing that the liner material has a coefficient of thermal expansion and contraction greater than than of the outer shell.

The number and location of the specific location of the ribs or grooves depends upon the allowable strain the liner material can safely operate under. When polyethylene was employed the spacing of the ribs or grooves was about 4.50 inches. This was based on a minimum allowable shrinkage retention of 0.025 inches per rib or groove. The coefficient of thermal contraction at the design allowable low temperature was 0.0055 inch per inch.

If a pressure vessel such as a water softener having a thermoplastic liner which is not mechanically held to the outer shell is held at low temperature while undergoing pressure cycles from a high pressure to atmospheric pressure, the liner will be forced back and forth due to the internal pressure and thermal contraction until it eventually fails in tension. Once the liner has cracked through, the pressure vessel cannot contain pressurized fluid.

This invention allows a pressure vessel having a blow molded thermoplastic liner to be mechanically held so that it can be pressure cycled at low temperature without failure of the liner.

In the construction of the pressure vessel of this invention, the liner is first made by blow molding a suitable thermoplastic material into a mold to form grooves or ribs on the outer surface of the liner. Then a continuous resin impregnated glass roving is wound over the liner with the windings conforming to the shape of the grooves or ribs so that when the tank is cured the grooves and ribs mechanically lock the liner to the shell of the tank, and the liner is thereby prevented from shrinking away from the outer shell when exposed to low temperatures and while at a zero psi condition.

Various modes of carrying out this invention are contemplated as being within the scope of the following claims, particularly pointing out and distinctly claiming the subject matter which is regarded as the invention.

I claim:

1. A lined pressure vessel comprising an outer shell of thermosetting resin impregnated filaments, a corrosion resistant one piece plastic liner overlying the entire inner surface of the shell and having a coefficient of thermal expansion and contraction substantially greater than the shell, and a plurality of longitudinally spaced annularly extending abutments integrally provided on the outer surface of the body of the liner and embedded in intimate engagement with the resin impregnated filaments of the shell to mechanically lock the liner to the shell and restrain movement of the liner relative to the shell when the vessel is in service.

2. The lined pressure vessel of claim 1 in which the abutments are longitudinally spaced annular ribs projecting from the outer surface of the liner.

3. The lined pressure vessel of claim 1 in which the abutments are ribs extending spirally around the liner throughout the length thereof.

4. The lined pressure vessel of claim 1 in which the abutments are longitudinally spaced grooves provided in the outer surface of the liner.

5. The lined pressure vessel of claim 1 in which the liner is blow molded, polyethylene and the resin impregnated filaments are wound around the liner and the tank has a port at one end, and sharp corners are provided on the sides of each abutment toward the port in the tank.

6. The lined pressure vessel of claim 1, in which the abutments on the outer surface of the liner are of wedge shape.

7. The lined pressure vessel of claim 1 in which the abutments are spaced ribs with the ribs on one side of the liner extending partially around the circumferential surface of the liner and the ribs on the opposite side of the liner extending around the opposite circumferential surface of the liner and offset longitudinally from the first named ribs.

* * * * *

UNITED STATES PATENT OFFICE
CERTIFICATE OF CORRECTION

PATENT NO. : 3,874,544
DATED : April 1, 1975
INVENTOR(S) : EMERSON R. HARMON

It is certified that error appears in the above-identified patent and that said Letters Patent are hereby corrected as shown below:

Assignee:  Cancel "Amolga" and substitute therefor

---Amalga---.

Signed and Sealed this fifth Day of August 1975

[SEAL]

Attest:

RUTH C. MASON
Attesting Officer

C. MARSHALL DANN
Commissioner of Patents and Trademarks